United States Patent [19]

Schmidt et al.

[11] Patent Number: 4,603,054
[45] Date of Patent: Jul. 29, 1986

[54] PROCESS FOR PREPARING ALGIN/CALCIUM GEL STRUCTURED MEAT PRODUCTS

[75] Inventors: Glenn R. Schmidt; Warrie J. Means, both of Ft. Collins, Colo.

[73] Assignee: Colorado State Univ. Research Foundation, Ft. Collins, Colo.

[21] Appl. No.: 714,705

[22] Filed: Mar. 21, 1985

[51] Int. Cl.$^4$ ............................................. A23L 1/317
[52] U.S. Cl. ..................................... 426/574; 426/646
[58] Field of Search ............... 426/574, 641, 646, 513, 426/575

[56] References Cited

U.S. PATENT DOCUMENTS

| | | | |
|---|---|---|---|
| 1,814,981 | 7/1931 | Thornley et al. | 260/108 |
| 2,036,922 | 4/1936 | Clark et al. | 260/108 |
| 2,036,934 | 4/1936 | Green | 260/108 |
| 2,128,551 | 8/1938 | Le Gloahec | 260/116 |
| 2,441,729 | 12/1959 | Steiner . | |
| 2,918,375 | 12/1959 | Gibsen . | |
| 3,255,021 | 6/1966 | Earle . | |
| 3,365,305 | 1/1968 | Hunter . | |
| 3,395,024 | 7/1968 | Earle . | |
| 3,455,701 | 7/1969 | Miller . | |
| 3,769,027 | 10/1973 | Mangiere . | |
| 4,053,627 | 10/1977 | Schor | 424/278 |
| 4,163,805 | 8/1979 | Mueller | 426/575 |
| 4,347,261 | 8/1982 | Challen | 426/573 |
| 4,348,418 | 9/1982 | Smith et al. | 426/574 X |

FOREIGN PATENT DOCUMENTS

| | | | |
|---|---|---|---|
| 71678 | 1/1976 | Australia . | |
| 9735 | 1/1980 | Japan | 426/641 |
| 1474629 | 5/1977 | United Kingdom . | |

OTHER PUBLICATIONS

Dialog Search-Food Sci. & Technology Abstracts.
Technical Bulletin F-83, Kelco Company, Jan., 1984.
Beef, Oct., 1984, page 6.

Primary Examiner—Arthur L. Corbin
Attorney, Agent, or Firm—Burton, Dorr & Carson

[57] ABSTRACT

Structured meat products, particularly structured raw meat products, are prepared by mixing comminuted meat or trimmings with powdered sodium alginate and powdered calcium carbonate. A slow release acid, such as glucono-delta-lactone, citric acid, lactic acid and the like, can also be added. The slow hydrolysis of the powdered form of such acids slowly lowers the pH of the meat to improve its flavor, but still ultimately produces enough hydrogen ions to stimulate the release of sufficient calcium ions from the calcium salt to accelerate formation of an algin/calcium gel. In either case, after being formed into the desired shape, the meat is stored, usually under refrigeration, from about one to four days to allow the algin/calcium gel to set. Thereafter, the resulting structured meat product can be conveniently portioned, packaged and marketed as a refrigerated raw meat product, a frozen raw meat product, or precooked and marketed refrigerated or frozen.

6 Claims, No Drawings

PROCESS FOR PREPARING ALGIN/CALCIUM GEL STRUCTURED MEAT PRODUCTS

FIELD OF THE INVENTION

This invention relates to structured food products which are formed by use of the algin/calcium gel reaction. More particularly, our invention relates to use of the algin/calcium gel reaction in the context of meat products.

BACKGROUND OF THE INVENTION

Algin is a complex hydrocolloid obtained from brown seaweed such as (Laminaria, Macrocystis, Ascophyllum, and the like. It is precipitated by acid and is soluble in aqueous alkaline media wherein the alkalinity is due to the presence of alkali metals or ammonium. However, in the presence of certain di- and trivalent cations it is insoluble. For example, water soluble sodium alginates react with soluble calcium salts to form insoluble calcium alginate gels. Furthermore, the preferential affinity exhibited by algin for calcium rather than sodium, can be enhanced by the inclusion of an ionizing compound of calcium such as a weak acid in common solution with the sodium alginate.

Alginate gels are used in a wide variety of food preparation technologies, especially those associated with the production of desserts, jellies, pie fillings and the like. They are also used to stabilize and to otherwise modify the rheology of food sols during various food production procedures. One of their more useful properties is their ability to form chemically, rather than thermally, induced gels. These gels result from the intermolecular association of the above noted di- and trivalent cations with the dimerically associated guluronic acid block regions of the alginate molecules. Again, calcium ions are generally regarded as superior to other polyvalent ions in their interaction with algin, particularly in the context of food systems. Specific examples of the application of this chemical mechanism can be found in the preparation of a wide variety of fruit jams, jellies, jellied salads, and jellos such as those produced by the interaction of various alginates with calcium carbonate in the presence of sodium tripolyphosphate and adipic acid.

The literature discloses that most of the specific applications of the algin/calcium gel reaction to food technologies are carried out in the context of an aqueous media. For example, U.S. Pat. No. 2,441,729 discloses the manufacture of gels from water soluble algin, calcium salts, and weak acids such as acetic or citric acid, in conjunction with a gel retarding salt such as sodium hexametaphosphate. A similar, aqueous media, algin gel reaction is disclosed in U.S. Pat. No. 2,918,375 wherein adipic or fumaric acid is employed as the acid ingredient. These patents point out how, upon addition of such acids to an aqueous mixture of sodium alginate and a calcium salt, the calcium salt is ionized to yield calcium ions which, in turn, react with the soluble alginate to form insoluble calcium alginate. Calcium sulfate, gypsum and dicalcium phosphate are some of the more commonly used edible sources of calcium used in such processes.

As noted above, alginate gel compositions containing citric acid, water soluble alginate salts, calcium salts and sodium hexametaphosphate were once marketed in the form of dry, jello mixes, activated by the addition of water. These dry mix products were not altogether satisfactory however, chiefly because of their package instability. For reasons which were not clearly understood, the citric acid reacted with the calcium salt in the dry mix. Consequently, when the packaged materials were added to water they would not consistently form a gel. In an effort to overcome this problem with these citric acid-alginate gels, an attempt was made to use fumaric acid in lieu of citric acid. This approach was not altogether successful either because the fumaric acid-containing gels were found to be too grainy when hard water was used in their preparation. In an effort to solve the problems created by the use of fumaric acid in the alginate gels, an attempt was made to use adipic acid in lieu of fumaric acid. Adipic acid was found to be satisfactory in some respects but created other problems. For example, it was found that alginate gels containing adipic acid and a calcium phosphate salt gave a gel having a somewhat cloudy appearance. In an attempt to overcome this problem, it was found that the use of calcium carbonate as the calcium source rather than calcium sulfate or dicalcium phosphate gave a gel having the improved clarity required in a dessert gelatin. However, the use of adipic acid in a alginate gel created a further problem in that it produced a gel which had a disagreeable tartness. Although a certain degree of tartness is a desirable characteristic in some dessert gels, the tartness of adipic acid gels is very disagreeable in the context of other dessert items. It is even more disagreeable in the context of other nondessert food items, particularly meat products. In order to overcome this problem in the context of producing jellos, it was found that the use of sodium tripolyphosphate as a sequestionary in lieu of the sodium hexametaphosphate previously employed reduced the tartness of the gel to an acceptable level. U.S. Pat. No. 3,455,701 discloses a resulting gel mix containing a water soluble alginate, calcium carbonate, sodium triphosphate, and adipic acid. This mixture resolves the various problems encountered in the prior art by providing a package stable gel mix, a homogeneous gel which did not have a grainy consistency, a gel having the desired clarity for a dessert gel, and a gel whose taste was not disagreeably tart, at least in the context of dessert gels.

However, all of the above noted algin/calcium reaction gel mechanisms have been largely eschewed in the context of structured meat products. This follows from the fact that the tart flavors imparted by many of the calcium ionizing acids used in jello type products are objectionable in meat products. It also follows from the fact that the otherwise too rapid release of calcium during the aqueous mixing of desserts which is controlled by the use of certain calcium sequestrants cannot be similarly controlled in the context of structured meats. This is because the typical edible sequestrants used in dessert gel preparations, e.g., sodium hexametaphosphate, tetrasodium pyrophosphate and sodium citrate tend to impart severe off flavors to meat products even though their taste characteristics are not objectionable in the tart or sweet context of gelatin desserts, pie fillings, ice cream, milk puddings, frozen fruits and the like. Consequently, phosphate salts, such as sodium hexametaphosphate, sodium pyrophosphate and sodium tripolyphosphate are generally only added to processed meat products when other ingredients in such products can effectively mask the off flavors otherwise imparted by the phosphate salts. For example, bologna often contains phosphate salts at levels up to 0.5%. However, bologna products also generally have 2-3% sodium chloride present and/or spice mixes which tend to mask the off flavors imparted by the phosphate salts. However, since algin/calcium products do not generally contain sodium chloride and/or spice mixes, the off flavors imparted by such phosphate salts are usually detectable by the average consumer. Furthermore, for any given level of alginate and calcium salt, an increase in the level of sequestrant causes a progressively weaker final gel, since the ultimate distribution of the calcium ions between the alginate and sequestrant increasingly favors the latter. In other words, conversion of the sodium alginate into the gelled calcium form is progressively reduced and the resultant gel is progressively weakened in its structure. Such structural weaknesses are much less acceptable in the context of structured meat products, than they are in other types of gels.

However, some limited, and very specialized variations of the algin/calcium reaction have been successfully applied to the preparation of certain meat products. For example, dog and cat foods have been produced by variations of the algin/calcium reaction. These variations are well summarized in United Kingdom Pat. No. 1,474,629. They begin with a mixing of a finely divided mix or emulsion of animal and/or vegetable protein containing materials with an alginate. After forming, these products are then sprayed with an aqueous solution of a water soluble calcium salt. The calcium ions in the spray react with the algin near the surface of the product to form a skin on the outside of the product which is strong enough to enable it to withstand subsequent rough production handling. In a further variation of this process, a sparingly soluble calcium salt can also be added to the mix or emulsion in order to form a soft gel inside the strong skin. The final product, normally a gel of low grade meats, offals and/or vegetable proteins, is designed to simulate chunks of meat or meatballs. This process is not, however, well suited for the production of meat products intended for human consumption. There are a number of reasons for this. For example, the chunks or meatballs manufactured by the process of United Kingdom Pat. No. 1,474,629 are not intended to stick together with other meats or coagulated water soluble proteins. On the contrary, individual chunks or balls are the desired form of the end product of this process. In the context of human consumption however, an end product wherein actual chunks of meat are bound to other chunks of meat to form larger pieces rather than individual chunks or balls, makes for a far more desirable product form. Similarly, the skin produced by such a calcium chloride spray and the soft, high water content inner portions of these chunks or balls, are unacceptable to humans with respect to their inherent texture of "mouth feel". Furthermore, the concentrations of the calcium chloride spray needed to produce a skin capable of "encapsulating" the softer interior of these products are such that they impart severe off flavors which are unacceptable to human beings.

However, other specialized variations of the algin/calcium reaction have been specifically directed to food products intended for human consumption. They have met with varying degrees of success. For example, U.S. Pat. No. 3,769,027 teaches the production of a meat glazing material comprised of a hydrolyzate, fat, algin, a food grade phosphate, a food grade source of calcium and flavoring materials. The resulting powder is coated onto uncooked food stuff such as meat and during cooking the powder forms a continuous film or coat having a glazed appearance. This results in a meat having an attractive appearance and texture and also serves to seal in the juices of the meat during cooking and thereby keeping the meat moist and tender.

U.S. Pat. No. 3,395,024 teaches another coating process designed to retard spoilage in meat, seafood, poultry and the like. The process provides for the coating of food products, including meats, with an aqueous algin dispersion containing a carbohydrate comprising at least one sugar selected from the group consisting of monosaccharides and disaccharides dissolved in water. The coated product is then subjected to an aqueous gelling solution containing a water soluble source of calcium ion in order to bond the coating to the food product but without imparting any bitter taste thereto.

Such coatings have not, however, found great commercial acceptance or usage. They usually give an undesirable taste to cooked meats. Such prior art coatings also do not uniformly adhere to the meat product to which they are applied and they tend to crack and spall during storage and handling. Clear coating materials using mainly corn, carbohydrates and algin have been suggested as an alternative for increasing storage life, preserving quality and reducing moisture loss, but the use of such materials has not found great acceptance in the meat preparation industry. While such coating materials may improve the meat's texture and juiciness, and in some cases its color, appearance, surface texture and odor over uncoated products, the flavor for such coated products is decidedly inferior. This is largely due to the bitter flavor imparted by the calcium gelling solution when it is used in the context of converting the above-noted starch solutions to plastic-like coatings.

In view of the above difficulties encountered in trying to apply the algin/calcium reaction to meat products, structured meat products are currently produced by another technology, i.e., the technology used in making sausage. In sausage products, cohesion between meat pieces is accomplished by formation of a traditional myosin heat-set protein matrix following extraction of muscle proteins and subsequent heat treatment. These structured products must be marketed either frozen or precooked in order to retain their structural integrity. Sodium chloride and phosphate salts are used during the mechanical manipulation of such products in the extraction of the muscle proteins which are thereafter involved in the heat-set gelation. However, even though the traditional myosin heat-set gelation mechanism provides adequate binding of structured meat products in the cooked state, it is of little functional significance in the binding of uncooked meat pieces. These salt-phosphate structured meat products have other disadvantages as well. Prior to cooking, they must be kept frozen in order to retain their structural integrity. Furthermore, the addition of sodium chloride accelerates development of oxidative rancidity and, thus, off flavor and off odor development; sodium chloride is also known to cause discoloration of raw meat products. Finally, addition of sodium chloride and certain phosphates is now regarded as undesirable to certain consumers due to diet/health considerations.

Clearly then, structured meat products, particularly structured raw meat products, without high sodium chloride concentrations would provide a number of benefits to the meat marketplace since consumers generally prefer purchasing meat cuts in the raw, refrigerated state; consequently, algin/calcium structured meat products would have a definite retail marketing advantage over current myosin heat-set structured products. Furthermore, since freezing of such products would not be required, energy savings can be realized during the marketing and final cooking of meat products from a raw, rather than from a frozen state. Moreover, production of structured meat products using the algin/calcium gel mechanism does not require addition of sodium chloride or phosphates for effective binding. Hence, the detrimental effects of sodium chloride on oxidative rancidity rates and discoloration of refrigerated and frozen structured products can be avoided. Sodium sensitive individuals would also benefit from the production of structured meat products low in sodium content. The possible adverse effects of bone decalcification due to the presence of phosphates would also be avoided. Algin/calcium structured meat products would also possess many of the other advantages provided by current structured meat products. The meat industry would enjoy extensions of product lines, added value to trimmings and increased marketing alternatives. Consumers would enjoy new products intermediate in price and quality to ground meat and intact muscle portions as well as products available with variable fat levels. Such algin/calcium structured meat products would also prove useful in pre-cooked structured meats intended for microwave cooking. Our methods could be applied to a wide variety of meats intended for human consumption including but not limited to, chops, steaks, roasts, appetizers, fast food entrees and the like as well as seafood and poultry products.

SUMMARY OF THE INVENTION

Applicants have found a specialized algin/calcium gel reaction which can be used to produce tasty, structured meat products for human beings. They can be bound in a raw, refrigerated state as well as in a cooked or semi-cooked state. Our findings will permit structured meat products to be marketed at the retail meat case with other fresh meats. Although our process can be used to bind meats during and after heat processing, i.e., cooking, it is also particularly effective when applied to raw meats. That is to say, the same binding mechanism which works in a raw meat product will still work after that product is cooked. Currently no other binding technology works while the subject meat is in its raw state. Furthermore, our process can be utilized on meats from a wide variety of sources and in a wide variety of piece and particle sizes.

A preferred version of our process begins by reducing fresh or aged raw meat pieces to an appropriate particle size, depending on desired product attributes, by use of standard meat comminuting equipment (grinder, commitrol, chopper, etc.). The non-meat ingredients are then added during mild mixing of the meat pieces using typical mixing devices such as paddles or ribbon mixers. We have found that powdered non-meat ingredients are highly preferred in the practice of this invention. Powdered alginate and powdered carbonate are highly preferred in the practice of this invention. Optional ingredients hereinafter more fully described are also preferably administered to the meat in a powdered state.

We also have found that our powdered ingredients, e.g., powdered sodium alginate, powdered calcium carbonate and powdered optional ingredients such as glucono-delta-lactone and sodium erythorbate can be premixed dry and added to a meat block at the same time. That is, to say, no specific order of mixing of the non-meat ingredients with the meat is necessary. However, some preferred embodiments of this invention do involve the order in which the non-meat ingredients are added to the meat. For example, the slow acting acid, e.g., glucono-delta-lactone (GDL), citric acid, lactic acid etc., may be added to the meat product first. Optionally, various color and taste enhancers, such as for example sodium erythorbate, can also be conveniently added to the product at this point in our process. It should be noted that although the use of such edible acids is preferred, their presence is by no means necessary for the production of our structured meat products. If used however, the addition of such acids is preferably followed by a careful uniform addition of the powdered alginate ingredient. Finally, the powdered carbonate e.g., calcium carbonate is then added. A uniform distribution of these ingredients is highly preferred in order to avoid alginate pockets in the finished product. The resulting mixed ingredients can then be formed by molding or stuffing them into desired shapes. After the product is formed, it is stored, usually under refrigeration for a period sufficient to allow the algin/calcium gel to set, preferably rather slowly, e.g., for periods of from about 24 to about 96 hours. The refrigeration storage temperatures (32°–40° F., 0°–4.5° C.) serve to retard microbial and chemical spoilage of the meat while the gel is setting. As with all chemical reactions, our gelation reaction would probably occur faster at elevated temperatures and would likely occur much too slowly at subfreezing temperatures. If our gelation reaction occurred too quickly however, the product could not be shaped and molded into desired shapes (e.g., this happens when $CaCl_2$ is used as the carbonate source). However, after the desired shape is achieved, a gelation reaction could logistically occur at a much faster rate than it does in the preferred embodiments of our process. Therefore, our gelation process, using powdered gelation ingredients rather than those in an aqueous media, preferably is carried out for periods ranging from about 24 to about 96 hours, dependent on the gel strength desired. After the gel has set, the product may be portioned and packaged. In the alternative, the product may be precooked and frozen or the raw product may be frozen directly. The resulting packaged product can therefore be marketed as a raw, refrigerated, precooked, or as a frozen structured meat product which will extend and increase the uncooked storage life or shelf life of the product.

The various ingredients and methods employed in forming our algin/calcium gel structured meat products are illustrated and/or more particularly described by the following discussions and examples. They are offered as illustrations of, rather than limitations to, the overall structural meat concept of our invention.

The alginates which can be used in the practice of our invention can be those of ammonium, magnesium, potassium, sodium or other alkali metals or the alginate of an organic base such as mono-, di- or tri-ethanolamine, aniline, and the like. They may be prepared by well known methods such as those disclosed in U.S. Pat. Nos. 1,814,981; 2,036,922; 2,036,934 and 2,128,551. The alginates of sodium, particularly those in less degraded form, i.e., the high viscosity grades, are, however, highly preferred. Furthermore, within the context of alginates there are also many differences in monomeric composition and block structure which can lead to some variations in the practice of our invention. These variations follow from the fact that each alginate has its own characteristic calcium reactivity and gelation properties. Although the ratio of mannuronic acid to guluronic acid and hence the ratio M-blocks to G-blocks for various alginates can be determined experimentally, the detailed molecular composition of such alginates are still by and large unresolved. As a result, alginates are usually referred to as simply "high M" or "high G" depending on the proportions of mannuronic acid and guluronic acid they contain. Most commercial alginates, particularly sodium alginates, are of the high M type, the best example of which being the alginate obtained from the giant kelp (*Macrocystis pyrifera*), found off the coast of California. *Laminaria hyperborea*, harvested off the coast of Scotland, is known for its high G alginate content. In general, high G alginates produce strong, brittle gels that are heat stable, while high M alginates provide weaker, more elastic gels that have less heat stability but more freeze/thaw stability. In either case, however, the final gel strength can be adjusted by manipulation of the gel chemistry and, in some applications of this invention, the high G and high M alginates can be used interchangeably and/or intermixed. In any case, higher viscosity algins are preferred to the lower viscosity algins since our process preferably calls for the dispersion of the algin in powdered form; consequently, it must be comminuted to a grain size well adapted to the dispensing device employed; hence fine mesh, high gel strength alginates are preferred.

The salts which can yield cations which are capable of gelatinizing alginates are most preferably the salts of calcium. They may be either insoluble or slightly soluble in water, or which in aqueous solution are only slightly ionized. Mixtures of such calcium salts are also contemplated within the scope of the teachings of this invention. Common examples of such salts are calcium carbonate, which is highly preferred, tricalcium phosphate, dicalcium phosphate, calcium sulfate, calcium tartrate, etc. Although less preferred, salts of other alkali-earth metals (with the exception of magnesium which forms water soluble alginates) may be substituted for the calcium salts. Hence it will be understood from the above remarks, that reference to calcium carbonate is intended to be illustrative only. The other calcium salts may work equally well. The same principles in the use of corresponding salts of other alkali metals and/or of heavy metals would also be included within this disclosure. Naturally, all additives and reaction products must be safe for use in foods.

In addition to the alginate and calcium salts mentioned in the previous paragraph, various solubilizing agents may also be employed in the practice of this invention. Their use is optional. Such solubilizing agents would normally include one or more slow release, weak acids. It goes without saying that these slow release, weak acids also must be nontoxic, edible acids. Applicants have found that glucono-delta-lactone, lactic acid, and/or one or more of the alkali metal salts of such acids, e.g., citric acid, as well as various phosphoric acids can be optionally employed in the practice of our invention. These acids probably serve to expedite the gelation reaction because several of the calcium salts which can be used in the practice of this invention increase in solubility at a lower pH. Probably one reason that our gelation reaction takes such a relatively long time (e.g., 1-4 days) is because it takes this long for a sufficient number of calcium ions to associate with the algin polymers, thus displacing the sodium ions. Also, the calcium ions are released slowly from the sparingly soluble calcium salts. However, the calcium ions, once released, are preferentially bound by the alginate polymers, thus driving the equilibrium of the above reaction toward the production of calcium alginate. Moreover, such slow release acids also serve to slowly lower the pH of the meat while the gel is setting and during cooking, and thereby increasing the meat product's shelflife and improving its flavor.

Other optional ingredients may be added to our meat products in order to improve many of their other attributes. For example, sodium erythorbate can be conveniently added for the purposes of preserving color of our meat products since sodium erythorbate is known to serve in preserving the natural bright red color of the oxymyoglobin state of the meat pigment (myoglobin), by acting primarily as an antioxidant. Similarly, various flavoring agents and spices can be added as well as a variety of antimicrobial agents to protect the meat from attack from various microorganisms.

Suitable quantities of the calcium salts used in the practice of this invention e.g., calcium carbonate, tricalcium phosphate, dicalcium phosphate, etc., are from about 0.05 to about 0.50 percent of the meat product on a weight basis. Variations will generally depend on such factors as the amount of alginate used, the solubility of the calcium salt and the amount of water added to the meat. The alginate will preferably comprise from about 0.5 to about 2.0 percent of the product, again on a weight basis. Factors associated with the level of alginate use would include the particle size of the meat, the meat source and species, and/or the amount of added water. The alginate and calcium salts preferably should be in a substantially dry, powdered state when they are added to the meat. The slow acting acid will comprise from about 0.05 to about 0.30 weight percent of the meat product when it is employed. The level of acid use will be generally determined by the acid type used, raw meat pH, the desired flavor and/or the presence of other additives. Here again, powdered forms of the acid are highly preferred in the practice of our invention. Other optional ingredients, e.g., sodium erythorbate will generally comprise less than about 0.01 to about 0.05 percent by weight of the meat product. The comminuted meat itself will preferably comprise from about 99.40 to about 97.00 percent by weight of the entire structured meat product. The weight percentage of meat will, however, be much less than the above preferred levels when water is also added to the meat. For example, we have added up to 7% water to our meat products with good results, indicating that still greater amounts of water could be successfully added. In the case of certain pet foods, nearly 50% water could be added to a meat base, moist pack pet food product using our algin/calcium gel reaction. When water is added, the alginate preferably should still be added directly to the meat block, i.e., it should not be hydrated before addition.

The gel-inhibiting or gel-retarding salts commonly used in the dessert preparation industry are not generally required for the practice of our invention. The primary factors which control the speed of our gelation reaction are the solubility of the calcium salts used as well as the combined effects of mixing the alginate and calcium salts with the meat product while the nonmeat ingredients are in powdered form, and storing the resultant product under refrigeration for a one to four day period assure that the alginate/calcium gel reaction does not proceed too quickly. Again, the optional acid ingredients employed in our structured meat products should, of course, also be edible and nontoxic.

The flow release acids serve to produce an acidic pH in the meat. This acidity is not only beneficial to the taste of the meat, but also aids in the replacement of the sodium ions in the alginate. Again, suitable acids for this pH lowering purpose would include, but not be limited to, glucono-delta-lactone, citric acid, and lactic acid and the like. Glucono-delta-lactone is a particularly preferred slow release acid. When used, such acids will generally be employed in quantities sufficient to both lower the pH of the meat and to allow the calcium salt to react with the sodium of the alginate ingredient to form the insoluble gel. Again, suitable quantities of such acids are preferably from about 0.05 to about 0.30 weight percent of the product; however in many cases, they are more preferably used in concentrations from about 0.20 to about 0.30 weight percent of the meat product.

Although gel-inhibiting or gel-retarding salts are not required, they may nonetheless be used as optional ingredients. If desired, such materials may be used in quantities from about 0 to about 0.5 percent on a weight basis of the product. Typical gel-inhibiting salts would include tetrasodiumpyro phosphate, trisodium phosphate, sodium tripoly phosphate, sodium carbonate, potassium carbonate, sodium citrate, potassium citrate or a number of well known condensed phosphates such as, for example, sodium hexametaphosphate.

The chief purpose of our invention is to produce a combination of ingredients that will result in a tasty, structured meat product having the other attributes previously disclosed. The production of such products can be carried out in a number of ways without departing from the scope and spirit of this invention. For example, meat can be first comminuted to some appropriate particle size, which may depend upon certain desired product attributes. Standard meat comminuting equipment e.g., grinder, commitrol, chopper and so forth may be utilized in this first step of the process. Again, raw, cooked or partially cooked meats can be used as ingredients in our process. However, raw meats are by far the most preferred form of meat due to the reasons previously discussed. In any case, after cutting or comminution of the meat, the other ingredients are added during mild mixing of the meat pieces using typical meat mixing equipment, e.g., paddle or ribbon mixers. As previously noted, we have found that our basic powdered ingredients, i.e., sodium alginate and calcium carbonate, as well as our optional ingredients (preferably also powdered) such as glucono-delta-lactone and sodium erythrobate, can be conveniently premixed dry and then added to the meat block at the same time. That is, no specific order of addition of the non-meat ingredients is necessary. However, in some instances, the non-meat ingredients are preferably added to the meat in some specific sequences which represent preferred embodiments of our process. For example, applicants have found that, when they are used, the slow acting acids (and any other coloring agents or antibiotic agents) are, more preferably, the first ingredients added to the meat. These ingredients could be added in solution, but most preferably they are added to the meat in powdered form. Thereafter the alginate, e.g., sodium alginate is carefully added in powdered form and in a manner (e.g., by sifting) such that alginate pockets are avoided in the meat. Finally, the calcium salt ingredient is added. Like the sodium alginate, the calcium salt is also added to the meat in a powdered form in some manner which assures uniform distribution of ingredients throughout the meat. Dispensing mechanisms similar to flour sifters are well suited for this purpose for each of the ingredients. The meat and other ingredients should not however be overmixed. The mixing time will vary depending on the type of equipment used.

Thereafter the mixed ingredients can be formed by various molding or stuffing devices and/or by hand into the various desired shapes. For example, the stuffing of a log-rib-eye can be accomplished by use of those continuous meat stuffer devices well known to the art. After formation, the product must be stored to allow the algin/calcium gel to set. Normally the gel reaction will take from about 24 to about 96 hours, depending chiefly on the gel strength desired and upon the initial concentrations of the alginate and calcium salt ingredients and the calcium salt solubility. After the gel has set, the product may be portioned and packaged as a structured raw meat product. Again, other meat preservation techniques such as precooking and freezing, or freezing the raw product, may be employed in conjunction with the process taught by this disclosure.

To further illustrate our invention, there are presented the following examples in which all parts and percentages are by weight unless otherwise indicated. Again, these examples are intended as illustrations of, rather than limitations upon the scope of this invention.

EXAMPLE I

Philadelphia Style Structured Beef Steak

|  | Percent |
|---|---|
| Beef Trim | 99.41 |
| Sodium Alginate | 0.50 |
| Calcium Carbonate | 0.09 |
|  | 100.00% |

Lean (ca. 8% fat) fresh (2–4 days postmortem) beef trimmings from USDA choice and good grade carcasses were comminuted by grinding through a 0.75 inch × 1.25 inch kidney plate. The meat was then mildly mixed in a paddle mixer while the sodium alginate (Manugel OMB, Kelco Company, San Diego, CA) was added followed by the addition of calcium carbonate (Gamma Sperse-80, Georgia Marble Company, Tate, GA). The powdered sodium alginate and calcium carbonate were added using a flour sifter to assure uniform distribution throughout the meat. After these ingredients were well mixed they were transferred to a vacuum stuffer and stuffed through a rib-eye shaped stuffing horn to produce structure beef rib-eye logs. The structured rib-eye log was stored for four days at 38° F. At this time the structured rib-eye logs were thinly sliced (1/16 to ⅛ inch thick) to yield Philadelphia Style steaks. These were vacuum packaged and frozen.

This product can be thawed and grilled or grilled from the frozen state with onions, mushrooms, etc., to yield meat for "Philly" Style sandwiches.

EXAMPLE II

Structured Beef Rib-Eye Steaks

|  | Percent |
| --- | --- |
| Beef Trim | 98.62 |
| Sodium Alginate | 1.00 |
| Calcium Carbonate | 0.18 |
| Glucono-Delta-Lactone | 0.15 |
| Sodium Erythorbate | 0.05 |
|  | 100.00% |

Aged beef trim (ca. 2 weeks postmortem, ca. 15% fat) from USDA choice and good grade cattle was comminuted by grinding through a 1.0 inch grinder plate. The dry powdered ingredients, sodium alginate (Manugel DMB, Kelco Company, San Diego, CA), calcium carbonate (Gamma Sperse-80, Georgia Marble, Tate, GA), glucono-delta-lactone (Griffith Laboratories USA, Inc., Alsip, IL) and sodium erythorbate (Heller Seasonings and Ingredients, Inc., Bedford Park, IL) were premixed in the dry state. The premix was sifted into the meat block during mild mixing in a ribbon mixer, being careful to distribute ingredients evenly. The mixture was stuffed into a rib-eye shaped structured beef logs and stored at 35° F. for 1 day. Structured logs were sliced (½ to ¾ inch thick) on a multiple blade slicer and packaged.

Structured steaks prepared this way can be marketed either fresh, in the raw state, or frozen.

EXAMPLE III

Structured Beef Roast, Water Added

|  | Percent |
| --- | --- |
| Beef Trim | 92.59 |
| Sodium Alginate | 2.00 |
| Calcium Carbonate | 0.36 |
| Sodium Erythorbate | 0.05 |
| Water | 5.00 |
|  | 100.00% |

Fresh beef trim (2 to 5 days postmortem) from ungraded beef carcasses was used. All meat pieces were cut by hand to a size not exceeding 2-3 ounces. Powdered ingredients, sodium alginate (Manugel DMB, Kelco, San Diego, CA), calcium carbonate (Gamma Sperse-80, Georgia Marble Company, Tate, GA), and sodium erythorbate (Heller Seasonings and Ingredients, Inc., Bedford Park, IL) were added to the meat block during mixing using a flower sifter. After these ingredients were thoroughly mixed, water was added and mixing continued until all water was absorbed by the meat product then vacuum stuffed into large (5 to 6 inch diameter) impermeable casings and stored at 35° to 40° F. for 2 days. After storage casings were removed and these fresh structured beef roasts were cut into 2 to 4 pound portions. After appropriate packaging, this product can be marketed fresh or frozen as oven ready structured beef roasts.

EXAMPLE IV

Precooked, Microwaveable Structured Beef Steaks

|  | Percent |
| --- | --- |
| Beef Trim | 98.80 |
| Sodium Alginate | 0.80 |
| Calcium Carbonate | 0.15 |
| Glucono-Delta-Lactone | 0.25 |
|  | 100.00% |

Fresh beef trim (ca. 2 to 5 days postmortem) from USDA choice and good grade cattle was comminuted by grinding through a ¾ inch by 1.25 inch kidney plate. The dry powdered ingredients were premixed in the dry state (i.e., sodium alginate, Manugel DMB, Kelco Company, San Diego, CA; calcium carbonate, Gamma Sperse-80, Georgia Marble Company, Tate, GA; glucono-delta-lactone, Griffith Laboratories USA, Inc., Alsip, IL). Powdered ingredients were added to the meat block during mixing and mixing was continued until dry ingredients were well dispersed. Product was stuffed, using a vacuum stuffer, through a rib-eye shaped stuffing horn to produce structured beef rib-eye logs. The structured rib-eye logs were sliced (ca. ⅜ inch thick) into steaks which were subsequently cooked with a light smoke application in a convection oven to 140° F. After cooking, steaks were packaged and frozen.

These precooked, frozen structured beef steaks can quickly and conveniently be warmed in a microwave oven from the frozen or thawed state.

EXAMPLE V

Structured Beef Barbecue Ribs

|  | Percent |
| --- | --- |
| Beef Trim | 98.82 |
| Sodium Alginate | 1.00 |
| Calcium Carbonate | 0.18 |
|  | 100.00% |

Fresh beef trim (ca. 2 to 5 days postmortem) from USDA choice and good grade cattle was comminuted by grinding through a ¾ inch by 1.25 inch kidney plate. The sodium alginate (Manugel DMB, Kelco, San Diego, CA) and calcium carbonate (Gamma Sperse-80, George Marble Company, Tate, GA) were simultaneously added, using a flour sifter, to the meat block during mixing. Mixing was continued until all ingredients were evenly distributed. Product can be formed directly into rib (approximately 1×⅜×3 inches) or formed into a slab which can subsequently be cut into the appropriate size after the gel has set. In either case, the resulting product can be precooked (with or without smoke) or marketed uncooked.

To prepare barbecue ribs, either the precooked or raw ribs can be simmered in a suitable barbecue sauce until done.

EXAMPLE VI

Structured Beef Product

|  | Percent |
| --- | --- |
| Beef Trim | 91.60 |
| Sodium Alginate | 1.00 |
| Calcium Sulfate | 0.30 |
| Water | 7.00 |
| Tetrasodiumpyrophosphate | 0.10 |
|  | 100.00% |

Lean (ca. 8% fat) fresh (2–4 days postmortem) beef trimmings from USDA choice and good grade cattle were comminuted by grinding through a 1.0 inch plate. The meat was then mixed in a ribbon mixer while the sodium alginate (Manugel DMB, Kelco, San Diego, CA) was carefully sifted in, followed by addition of calcium sulfate. The granular tetrasodiumpyrophosphate (FMC Corporation, Philadelphia, PA) was slurried in the appropriate amount of water and added to the meat block last. After ingredients were thoroughly mixed, they were removed and formed into the desired product shape. Product was stored at 35°–40° F. until sufficient gel strength had developed (1–3 days).

Products made with this recipe may possess an astringent flavor. Therefore, these products are best prepared in heavy, flavorful sauces or an appropriate spice mix can be added during mixing of ingredients.

EXAMPLE VII

Structured Veal Cutlets

|  | Percent |
| --- | --- |
| Veal Trim | 98.87 |
| Sodium Alginate | 0.70 |
| Calcium Carbonate | 0.13 |
| Sodium Erythorbate | 0.05 |
| Glucono-Delta-Lactone | 0.25 |
|  | 100.00% |

Lean (ca. 6% fat) fresh (2–7 days postmortem) ungraded veal trimmings were comminuted by hand using a knife to yield pieces no larger than 1.0 inches square. Powdered ingredients (sodium alginate, Manugel DMB, Kelco, San Diego, CA; calcium carbonate, Georgia Marble Company, Tate, GA; sodium erythorbate, Heller Seasonings and Ingredients, Inc., Bedford Park, IL; and glucono-delta-lactone, Griffith Laboratories USA, Inc., Alsip, IL) were preblended, dry and added to the meat block during mild mixing. Product was then formed into a log and stored under refrigeration (35°–40° F.) until the gel had set (ca. 2 days). At this time product was thinly sliced to yield structured veal cutlets.

EXAMPLE VIII

Structured Pork Steaks

|  | Percent |
| --- | --- |
| Pork Trim | 98.87 |
| Sodium Alginate | 0.70 |
| Calcium Carbonate | 0.13 |
| Sodium Erythorbate | 0.05 |
| Glucono-Delta-Lactone | 0.25 |
|  | 100.00% |

Lean (ca. 10% Fat) fresh (2–7 days postmortem) pork trimmings were comminuted by hand using a knife to yield pieces no larger than 1.0 inches square. Powdered ingredients (sodium alginate, Manugel DMB, Kelco, San Diego, CA; calcium carbonate, Georgia Marble Company, Tate, Ga; sodium erythorbate, Heller Seasonings and Ingredients, Inc., Bedford Park, IL; and glucono-delta-lactone, Griffith Laboratories USA, Inc., Alsip, IL) were preblended, dry and added to the meat block during mild mixing. Product was then formed into a log and stored under refrigeration (35°–40° F.) until the gel had set (ca. 2 days). At this time, the product was sliced (½ inch thick) and packaged.

EXAMPLE IX

Structured Fresh, Roasting Turkey Breast

|  | Percent |
| --- | --- |
| Turkey Breast | 98.87 |
| Sodium Alginate | 0.70 |
| Calcium Carbonate | 0.13 |
| Sodium Erythorbate | 0.05 |
| Glucono-Delta-Lactone | 0.25 |
|  | 100.00% |

Lean (ca. 6% Fat) fresh (2–7 days postmortem) turkey trimmings were comminuted by hand using a knife to yield pieces of adequate size. Powdered ingredients (sodium alginate, Manugel DMB, Kelco, San Diego, CA; calcium carbonate, Georgia Marble Company, Tate, GA; sodium erythorbate, Heller Seasonings and Ingredients, Inc., Bedford Park, IL; and glucono-delta-lactone, Griffith Laboratories USA, Inc., Alsip, IL) were preblended, dry and added to the meat block during mild mixing. Product was then formed and stored under refrigeration (35°–40° F.) until the gel had set (ca. 2 days). This product can be marketed as fresh, structured turkey roasts.

EXAMPLE X

Structured Chicken Steaks

|  | Percent |
| --- | --- |
| Chicken Trim | 98.87 |
| Sodium Alginate | 0.70 |
| Calcium Carbonate | 0.13 |
| Sodium Erythorbate | 0.05 |
| Glucono-Delta-Lactone | 0.25 |
|  | 100.00% |

Fresh (2–7 days postmortem) chicken trim was comminuted by grinding through a 1.0 inch plate. Powdered ingredients (sodium alginate, Manugel DMB, Kelco, San Diego, CA; calcium carbonate, Georgia Marble Company Tate, GA; sodium erythorbate, Heller Seasonings and Ingredients, Inc., Bedford Park, IL; and glucono-delta-lactone, Griffith Laboratories USA, Inc., Alsip, IL) were preblended, dry and added to the meat block during mild mixing. Product was then formed into a log and stored under refrigeration (35°–40° F.) until the gel had set (ca. 2 days). Product was then sliced and packaged. These chicken steaks can be breaded and precooked as a meat entree in quick dinners.

EXAMPLE XI

Structured Lamb Roast

|  | Percent |
| --- | --- |
| Lamb Trim | 98.87 |
| Sodium Alginate | 0.70 |
| Calcium Carbonate | 0.13 |
| Sodium Erythorbate | 0.05 |
| Glucono-Delta-Lactone | 0.25 |
|  | 100.00% |

Lean (ca. 6% fat) fresh (2-7 days postmortem) lamb trimmings were comminuted by grinding through a 1.0 inch plate. Powdered ingredients (sodium alginate, Manugel DMB, Kelco, San Diego, CA; calcium carbonate, Georgia Marble Company, Tate, GA; sodium erythorbate, Heller Seasonings and Ingredients, Inc., Bedford Park, IL; and glucono-delta-lactone, Griffith Laboratories USA, Inc, Alsip, IL) were preblended, dry and added to the meat block during mild mixing. Product was then formed into 2-3 pound roasts and stored under refrigeration (35°-40° F.) until the gel had set (ca. 2 days). Product was then packaged.

EXAMPLE XII

Structured Fish Fillet

|  | Percent |
| --- | --- |
| Fish | 98.87 |
| Sodium Alginate | 0.70 |
| Calcium Carbonate | 0.13 |
| Sodium Erythorbate | 0.05 |
| Glucono-Delta-Lactone | 0.25 |
|  | 100.00% |

Fresh (2-7 days postmortem) or frozen and thawed fish trimmings were comminuted by hand using a knife to yield pieces no larger than 1.0 inches square. Powdered ingredients (sodium alginate, Manugel, DMB, Kelco, San Diego, CA; calcium carbonate, Georgia Marble Company, Tate, GA; sodium erythorbate, Heller Seasonings and Ingredients, Inc., Bedford Park, IL; and glucono-delta-lactone, Griffith Laboratories USA, Inc., Alsip, IL) were preblended, dry and added to the meat block during mild mixing. Product was then formed into logs and stored under refrigeration (35°-40° F.) until the gel had set (ca. 3 days). Product was then sliced into appropriate fillets and packaged.

EXAMPLE XIII

Structured Beef Steaks for Beef Stroganoff

|  | Percent |
| --- | --- |
| Beef Trim | 98.62 |
| Sodium Alginate | 1.00 |
| Calcium Carbonate | 0.18 |
| Glucono-Delta-Lactone | 0.15 |
| Sodium Erythorbate | 0.05 |
|  | 100.00% |

Fresh beef trim (ca. 2-7 days postmortem, ca. 15% fat) from USDA choice and good grade cattle was comminuted by grinding through a 1.0 inch grinder plate. The dry powdered ingredients, sodium alginate (Manugel DMB, Kelco Company, San Diego, CA), calcium carbonate (Gamma Sperse-80, Georgia Marble, Tate, GA), glucono-delta-lactone (Griffith Laboratories USA, Inc., Alsip, IL), and sodium erythorbate (Heller Seasonings and Ingredients, Inc., Bedford Park, IL) were premixed in the dry state. The premix was sifted into the meat block during mild mixing in a ribbon mixer, being careful to distribute ingredients evenly. The mixture was stuffed into a rib-eye shaped structured beef logs and stored at 35° F. for 1 day. Structured logs were sliced (⅜ inch thick) on a multiple blade slicer and packaged.

Structured steaks prepared this way can be marketed either fresh, in the raw state, or frozen. These steaks can be packaged with a sauce/spare mix for beef stroganoff and will maintain adequate binging properties while being simmered in the sauce.

As illustrated by the foregoing examples, our invention has great application to the formulation of a wide variety of structured meat products. An important feature of many of these products is that they can be structured and marketed in a raw state. However, those skilled in this art will appreciate that cooked meats such as those taught in Example IV may also be utilized. Moreover, those skilled in the art will also appreciate that we have illustrated our invention by resorting to a number of examples showing meat species, ingredient percentages, mixing conditions, temperatures, storage times and the like. It should be understood, however, that such examples are only employed for purposes of illustration and should not be construed as limiting our invention, as it is defined by the following claims.

Thus having disclosed our invention, we claim:

1. A process for producing a structured meat product comprising the steps of:
   (a) reducing a meat to a desired size;
   (b) blending the meat with, on a weight basis, a powdered mixture comprised of from about 0.5 to about 2.0 percent alginate powder and from about 0.10 to about 0.50 percent calcium salt powder;
   (c) forming the resulting meat/alginate powder/calcium salt powder mixture into a desired shape; and then
   (d) storing the resulting meat/alginate powder/calcium salt powder mixture for a time period sufficient to allow the alginate powder and calcium salt powder to form a gel strong enough to produce a structured meat product.

2. A process for producing a structured meat product comprising the steps of:
   (a) reducing a meat to a desired size;
   (b) blending the meat with, on a weight basis, a powdered mixture comprised of from about 0.05 to about 0.30 percent slow release acid, from about 0.5 to about 2.0 percent alginate powder and from about 0.10 to about 0.50 percent calcium salt powder;
   (c) forming the resulting meat/slow release acid/alginate powder/calcium salt powder mixture into a desired shape; and then
   (d) storing the resulting meat/slow release acid/alginate powder/calcium salt powder mixture to form a gel strong enough to produce a structured meat product.

3. A process for producing a structured meat product comprising the steps of:
   (a) reducing a meat to a desired size;
   (b) blending the meat with, on a weight basis, a powdered mixture comprised of from about 0.5 to about 2.0 percent alginate powder;
   (c) blending the meat/alginate powder mixture with, on a weight basis, from about 0.10 to about 0.50 percent calcium salt powder;
   (d) forming the resulting meat/alginate powder/calcium salt powder mixture into a desired shape; and then
   (e) storing the resulting meat/alginate powder/calcium salt powder mixture for a time period sufficient to allow the alginate powder and calcium salt powder to form a gel strong enough to produce a structured meat product.

4. A process for producing a structured meat product comprising the steps of:
 (a) reducing a meat to a desired size;
 (b) blending the meat with, on a weight basis, from about 0.05 to about 0.30 percent slow release acid;
 (c) blending the meat/slow release acid mixture with, on a weight basis, from about 0.5 to about 2.0 percent alginate powder;
 (d) blending the meat/slow release acid/alginate powder mixture with, on a weight basis, from about 0.10 to about 0.50 percent calcium salt powder;
 (e) forming the resulting meat/slow release acid/alginate powder/calcium salt powder mixture into a desired shape; and then
 (f) storing the resulting meat/slow release acid/alginate powder/calcium salt powder mixture for a time period sufficient to allow the alginate powder and calcium salt powder to form a gel strong enough to produce a structured meat product.

5. A process for producing a structured raw beef product comprising the steps of:
 (a) reducing raw beef to a desired size;
 (b) blending the raw beef with, on a weight basis, a powdered mixture comprised of from about 0.5 to about 2.0 percent alginate powder and from about 0.10 to about 0.50 percent calcium salt powder;
 (c) forming the resulting raw beef/alginate powder/calcium salt powder mixture into a desired shape; and then
 (d) storing the resulting raw beef/alginate powder/calcium salt powder mixture under refrigeration for from about 24 hours to about 96 hours to allow the alginate powder and calcium salt powder to form a gel strong enough to produce a structured meat product.

6. A process for producing a structured raw beef product comprising the steps of:
 (a) comminuting raw beef to a desired size;
 (b) blending the raw beef with, on a weight basis, from about 0.20 to about 0.30 percent glucono-delta-lactone and from about 0.01 to about 0.05 percent sodium erythorbate to form a raw beef mixture;
 (c) blending the raw beef mixture with, on a weight basis, from about 0.7 to about 1.0 percent sodium alginate powder;
 (d) blending the raw beef mixture and sodium alginate powder with, on a weight basis, from about 0.10 to about 0.25 percent calcium carbonate powder;
 (e) forming the resulting raw beef product mixture into a desired shape; and then
 (f) storing the resulting raw beef product mixture at from about 0 to about 5 degrees centigrade for a period of from about 24 hours to about 96 hours to allow the sodium alginate and calcium carbonate to undergo a gelation reaction storing enough to produce a structured beef product.

* * * * *